US 8,720,201 B2

United States Patent
Chapski et al.

(10) Patent No.: US 8,720,201 B2
(45) Date of Patent: May 13, 2014

(54) METHOD OF MONITORING AN ELECTRONIC ENGINE CONTROL (EEC) TO DETECT A LOSS OF FUEL SCREEN OPEN AREA

(75) Inventors: David L. Chapski, Southwick, MA (US); Thomas A. Bush, Vernon Rockville, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 669 days.

(21) Appl. No.: 12/953,671

(22) Filed: Nov. 24, 2010

(65) Prior Publication Data
US 2012/0130587 A1    May 24, 2012

(51) Int. Cl.
*F02D 23/00*  (2006.01)

(52) U.S. Cl.
USPC ............ 60/603; 701/104; 701/100; 701/103; 60/39.281; 60/790; 251/118; 251/129.04

(58) Field of Classification Search
None
See application file for complete search history.

(56) References Cited

U.S. PATENT DOCUMENTS

| | | | |
|---|---|---|---|
| 4,604,701 A * | 8/1986 | Fujawa et al. | 701/99 |
| 4,612,616 A * | 9/1986 | Binns et al. | 701/100 |
| 4,622,808 A | 11/1986 | Kenison et al. | |
| 4,866,980 A | 9/1989 | Falkmann et al. | |
| 5,023,793 A | 6/1991 | Schneider et al. | |
| 5,029,441 A | 7/1991 | Parsons | |
| 5,274,996 A * | 1/1994 | Goff et al. | 60/790 |
| 5,303,142 A | 4/1994 | Parsons et al. | |
| 5,474,052 A | 12/1995 | Aquino et al. | |
| 5,515,833 A | 5/1996 | Cullen et al. | |
| 5,517,972 A * | 5/1996 | Stockner | 123/496 |
| 5,526,794 A | 6/1996 | Messih et al. | |
| 5,551,410 A | 9/1996 | Messih et al. | |
| 5,666,918 A | 9/1997 | Pallett et al. | |
| 6,913,004 B2 * | 7/2005 | Pellizzari et al. | 123/549 |
| 2001/0037670 A1 * | 11/2001 | Boger et al. | 73/1.72 |
| 2003/0046937 A1 * | 3/2003 | Mahoney et al. | 60/773 |
| 2003/0192300 A1 * | 10/2003 | Mahoney et al. | 60/39.281 |
| 2004/0094029 A1 * | 5/2004 | Miller et al. | 91/399 |
| 2005/0211229 A1 * | 9/2005 | Pellizzari et al. | 123/525 |

* cited by examiner

*Primary Examiner* — Helal A Algahaim
*Assistant Examiner* — Paul Castro
(74) *Attorney, Agent, or Firm* — Cantor Colburn LLP

(57) ABSTRACT

A method of sensing a reduction in fuel screen area in a fuel system. The method includes detecting an engine shutdown, initiating an electronic engine control (EEC) built in test, shifting a metering valve from a first position to a second position, determining a travel time of the metering valve, and sensing a reduction in fuel screen area based on the travel time of the metering valve.

13 Claims, 3 Drawing Sheets

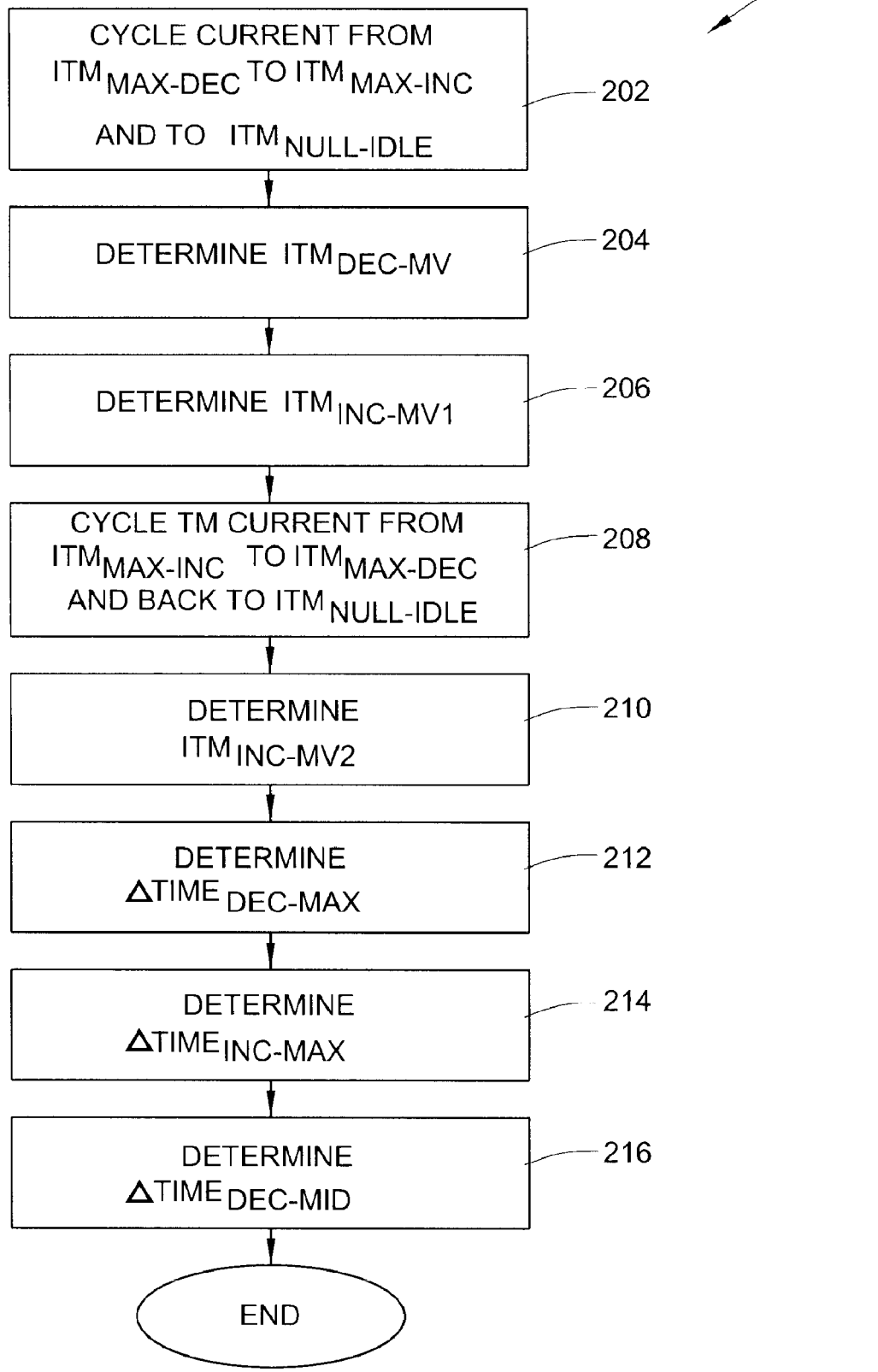

METHOD OF MONITORING AN ELECTRONIC ENGINE CONTROL (EEC) TO DETECT A LOSS OF FUEL SCREEN OPEN AREA

BACKGROUND OF THE INVENTION

Exemplary embodiments pertain to the art of electronic engine controls (EEC) and, more particularly, to a method of monitoring an EEC to detect a loss of fuel screen open area.

Engines, particularly those used to power aircraft, rely on response characteristics of metered flow provided by a fuel control to provide proper dynamic performance. Monitoring response characteristics supports typical engine transients such as deceleration/acceleration and for less typical transients such as surge recovery and overspeed shutdown. In a typical fuel control algorithm, an electronic engine control (EEC) schedules fuel flow by establishing an opening of a metering valve (MV) having a flow window including a flow window area. The opening is based on signals from an electrical feedback device. The flow window area in conjunction with a pressure regulating valve (PRV) maintains a relatively constant pressure drop across the flow window to provide required fuel flow. The MV is typically controlled by a single stage servovalve (SSSV) that includes a torque motor (TM) that schedules the opening either with a jet pipe receiver/receiver ports or a flapper/nozzle(s) hydraulic circuit. The Velocity and direction of the MV is based upon a direction and level of current change from a null current.

Fuel controls generally include screens that are positioned to protect various hydraulic connections to the SSSV. During operation, contaminants in the fuel and/or fuel coking resulting from elevated fuel temperatures may block or clog the screens. Contaminants and/or coking blockage decrease an overall flow area of the screens. The decreased flow area reduces SSSV fuel flow used to position the MV. Difference screen locations within the SSSV hydraulic circuit determines whether a blockage will decrease MV velocity in an increasing, decreasing, or both increasing and decreasing flow directions.

BRIEF DESCRIPTION OF THE INVENTION

Disclosed is a method of sensing a reduction in fuel screen area in a fuel system. The method includes detecting an engine shutdown, initiating an electronic engine control (EEC) built in test, shifting a metering valve from a first position to a second position, determining a travel time of the metering valve, and sensing a reduction in fuel screen area based on the travel time of the metering valve.

Also disclosed is an electronic engine control (EEC) including processing circuitry that, in response to a set of instructions, directs the EEC to detect an engine shutdown, initiate an electronic engine control (EEC) built in test, shift a metering valve from a first position to a second position, determine a travel time of the metering valve, and sense a reduction in fuel screen area based on the travel time of the metering valve.

Further discloses is a fuel control system including a servovalve having a torque motor and at least one screen, a metering valve fluidly connected to the servovalve, and an electronic engine control (EEC) operatively connected to the servovalve. The EEC is configured and disposed to determine a flow parameter of the at least one screen.

BRIEF DESCRIPTION OF THE DRAWINGS

The following descriptions should not be considered limiting in any way. With reference to the accompanying drawings, like elements are numbered alike:

FIG. 3 is a flow diagram illustrating a method of detecting a loss of fuel screen area of a metering valve in accordance with an exemplary embodiment.

DETAILED DESCRIPTION OF THE INVENTION

A detailed description of one or more embodiments of the disclosed apparatus and method are presented herein by way of exemplification and not limitation with reference to the Figures.

Increasing performance of engines, particularly those employed in powered flight is of continued concern. One area of current interest is response characteristics of a metering valve (MV) to commands from an electronic engine control (EEC). Currently, fuel provided by a single stage servo valve (SSSV) that is used to position the MV passes through screen(s) that remove impurities. Over time, the screen(s) become clogged thereby reducing a flow or open area resulting in a lower flow. In addition, elevated fuel temperatures associated with modern engines leave deposits on the screen. The deposits contribute to a reduction in screen open area. By reducing flow through the screen, metering valve performance becomes sluggish. The sluggish response leads to unacceptable engine responsiveness. The unacceptable engine responsiveness may only occur during a critical engine transient such as during engine surge, or overspeed shutdown. Accordingly, exemplary embodiments provide a method that detects a loss or reduction of screen open area before engine responsiveness is degraded.

Figure 1:
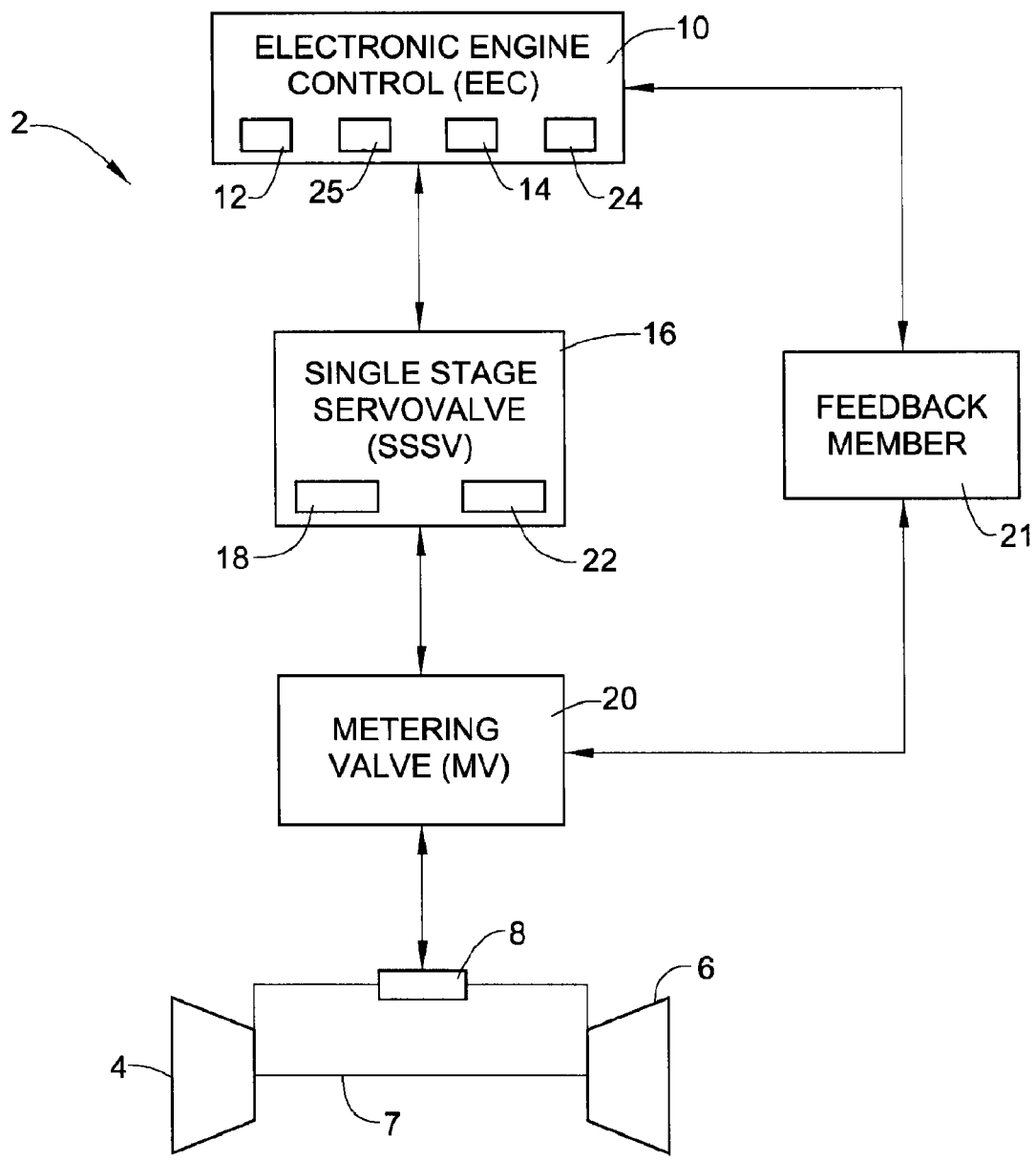
FIG. 1 is a schematic diagram depicting a turbomachine engine including an electronic engine control (EEC) programmed to detect loss of fuel screen area in accordance with an exemplary embodiment.

With reference to FIG. 1, an engine, depicted as a gas turbine engine, is generally indicated at 2. Gas turbine engine 2 includes a compressor section 4 that is operatively connected to a turbine section 6 via a common compressor turbine shaft 7. The compressor section 4, turbine section 6, and shaft 7 may include multiple stages and components to support multiple spools, such as low pressure and high pressure spools. Compressor section 4 is also fluidly connected to turbine section 6 via a combustor 8. Combustor 8 delivers fuel to be mixed with air from compressor section 4 and is combusted to form combustion gases. The combustion gases are delivered to turbine section 6. Turbine section 6 converts thermal and kinetic energy from the combustion gases to mechanical rotation energy that is used for powered flight. An electronic engine control (EEC) 10 including processing circuitry 12 and memory 14 controls fuel delivery to combustor 8. EEC 10 is operatively connected to a single stage servovalve (SSSV) 16 having a torque motor 18 that is selectively activated to control fuel delivery to a metering valve (MV) 20. SSSV 16 also includes one or more screens 22 that prevent contaminate from entering the fuel used to control MV 20. One of ordinary skill in the art should understand that screens 22 could also be located in an adjacent fuel control component. EEC 10 controls torque motor 18 to cause SSSV 16 to deliver fuel to MV 20 to establish a set point which defines a desired fuel burn flow rate to combustor 8. EEC 10 is also shown to include a feedback control member 21. Feedback control member 24 provides position feedback from MV 20 to EEC 10.

Processing circuitry 12 may include any combination of processing circuits known in the art, such as one or more microprocessors, microcontrollers, digital signal processors, and/or programmable logic devices. The memory 14 can store executable instructions and data to implement control laws of the EEC 10. EEC 10 also includes a SSSV interface 24 that converts data from SSSV 16 into a format usable by processing circuitry 12 for instance, a frequency-to-digital converter. EEC 10 further includes a feedback member interface 25 that receives signals from feedback member 21 which provides an indication of metering valve opening as set by torque motor 18 and also provides a pathway for EEC 10 to control torque motor 18 to set a new valve opening for MV 20. For example, EEC 10 can source a controlled amount of current to torque motor 18 as a metering valve control signal.

Figure 2:
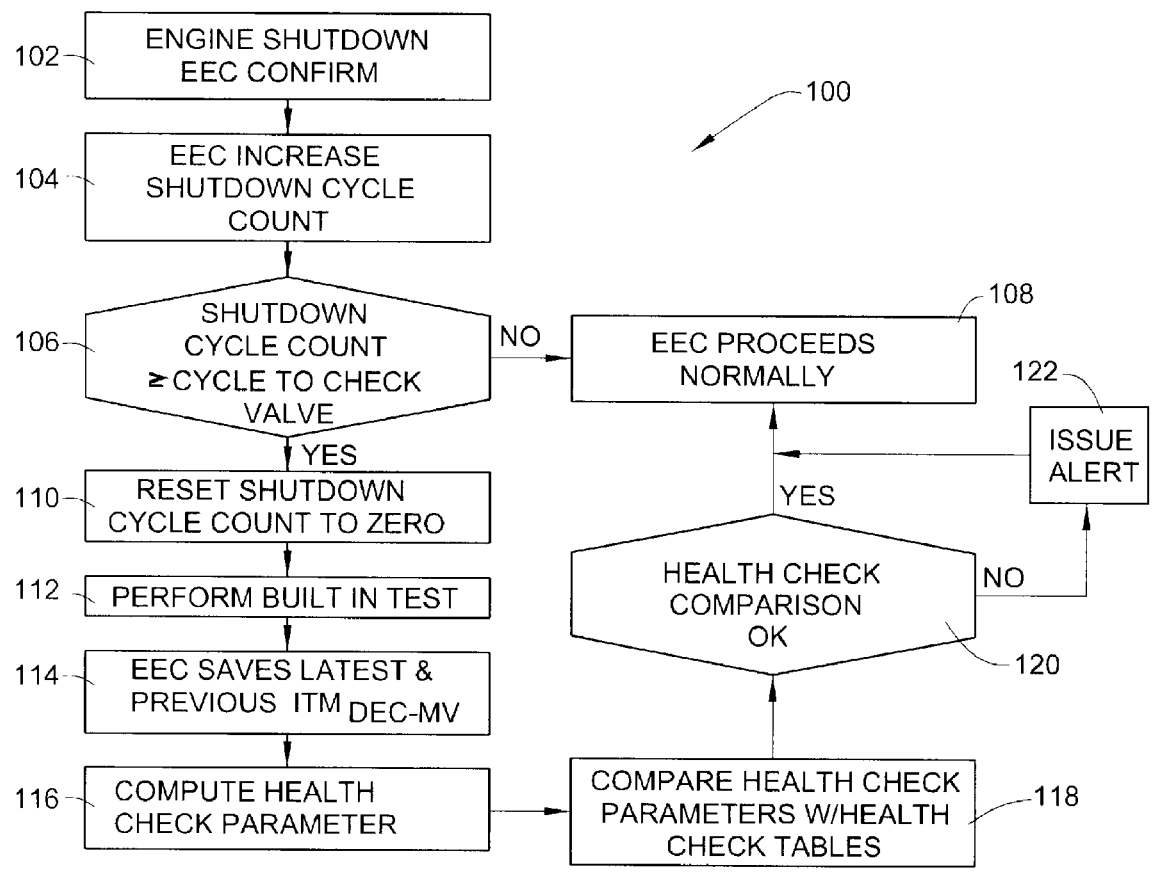
FIG. 2 is a flow diagram illustrating a method of initiating a loss of fuel screen area detection test in accordance with an exemplary embodiment.

Reference will now be made to FIG. 2 in describing a method 100 of determining a need for a SSSV screen test by EEC 10. Initially, engine 2 is shut down, and EEC 10 confirms the shut down of engine 2 in block 102. Following shut down, EEC 10 increments a shut down cycle count as indicated in block 104. At this point, a determination is made whether the shut down cycle count is at or above a desired cycle to check value in block 106. If the shut down cycle count is below the desired cycle to check value, EEC 10 proceeds normally, i.e., EEC 10 performs any final shut down steps. If, however, the shut down cycle count is at or above the desired cycle to check value, EEC 10 resets the shut down cycle count in step 110 and proceeds with a built-in test in block 112. During the built-in test, EEC 10 determines a number of built-in test values, namely a hysteresis of torque motor 18, a change in hysteresis from a previous built-in test, a maximum velocity ratio and a decreasing velocity ratios as well as a percentage change of the decreasing and maximum velocity ratios as compared to values obtained from the previous test. The built-in test values are compares with health check tables. Formulas for calculating the built-in test values will be presented below. The shut down cycle count is developed based on expected rate of blockage and subsequent loss of MV performance. In accordance with one aspect of the exemplary embodiment the shut down cycle count is decreased based on a second level of health check parameters after an initial failure in order to provide time for any necessary maintenance actions. As will be discussed more fully below, the fuel screen test determines whether there is any degradation in fuel flow area.

Following the fuel screen test, EEC 10 saves a new test result in memory 14 along with at least one previous test result as indicated in block 114. In block 116, EEC 10 computes a health check parameter of MV 20 based on the new test result and/or at least one previous test result. As will be discussed more fully below, metering valve travel time is an indication of a screen flow parameter or health. The health check approach described below avoids inherent variability found in a typical fuel system. Determining actual SSSV null bias for both a decreasing flow direction (ITMdecMV) and an increasing flow direction (ITMincMV) eliminates variability of null current resulting from pressure and temperature shifts as well as internal friction in MV 20.

Cycling SSSV current between ITMmaxDEC to ITMmaxINC eliminates variability caused by SSSV hysteresis resulting from magnetic effects of TM 18. Defining health parameters as ratios of travel time eliminates variability associated with fuel density and available pressure level. A max velocity ratio or travel time (ΔT) is used to determine a slew rate, that is utilized to monitor screen(s) that impact either the decreasing or increasing direction of MV 20. In the exemplary embodiment, slew rate is defined as ((final valve position− initial valve position)/travel time). A decreasing velocity ratio will monitor any screen(s) that impact the decreasing direction of MV 20. The decreasing flow direction is associated with engine surge and overspeed shutoff events.

The health check parameter is compared with health values stored in a look up table in memory 14 to determine whether the fuel screen requires service as indicated in block 118. At this point, a determination is made in block 120 whether the health check reveals that the fuel screen is clear. If clear, EEC 10 proceeds to remaining shut down steps in block 108. If the health check reveals an issue, for example, restricted flow area, EEC 10 issues an alert in block 122. The alert can be in a form of a maintenance flag or decreasing the desired cycle to check value.

At this reference will be made to FIG. 3 in describing a method 200 of testing MV 20 to determine fuel screen health. Initially, EEC 10 cycles current to torque motor 18 from $ITM_{MAX\_DEC}$ to $ITM_{MAX\_INC}$ and then to $ITM_{NULL\_IDLE}$ as indicated in block 202 in order to position metering valve at a first or LowMVX position. $ITM_{MAX\_DEC}$ and $ITM_{MAX\_INC}$ represent torque motor current required to operate SSSV 16 causing MV 20 to cycle, and $ITM_{NULL\_IDLE}$ represents torque motor current at shutdown. At this point, EEC 10 begins decreasing current to torque motor 18 in small steps until MV 20 starts to move to determine an $ITM_{DEC\_MV}$ value in block 204. The $ITM_{DEC\_MV}$ value represents current passed to torque motor 18 required to just start MV 20 moving in a decreasing flow direction. Step size is used to determine operating velocity of MV 20. After determining the $ITM_{DEC\_MV}$, EEC 10 increases current in small steps until MV 20 starts to move in an increasing flow direction to establish an $ITM_{INC\_MV1}$ value in block 206. In block 208, EEC 10 again cycles MV 20 between $ITM_{MAX\_DEC}$ and $ITM_{MAX\_INC}$ and then to $ITM_{NULL\_IDLE}$.

In block 210, EEC 10 determines an $ITM_{INC\_MV2}$ value by increasing current supplied to torque motor 18 until MV 20 starts to move in an increasing flow direction. In block 212, EEC 10 determines $\Delta\ Time_{DEC\_hd\ MAX}$ value or time duration required for MV 20 to travel between the first position (LowMVX) and the second position (HighMVX) in a decreasing flow direction in block 214. More specifically, EEC 10 sets current to $ITM_{MAX\_DEC}$ and then increases current to ($ITM_{INC\_MV2}$-$ITM_{MAX}$) until MV 20 travels from LowMVX to HighMVX. EEC 10 also determines $\Delta\ Time_{INC\_MAX}$ value or a time duration for MV 20 to travel between the first position (LowMVX) and a second position (HighMVX) in an increasing flow direction in block 214. More specifically, EEC 10 sets current to $ITM_{MAX\_INC}$ until MV 20 is at the High MVX position and then decreases current to ($ITM_{DEC\_MV}$-$ITM_{MAX}$) until MV 20 travels from the HighMVX position to the LowMVX position. EEC 10 further determines a $\Delta\ Time_{DEC\_MID}$ value or time required for MV 20 to travel from HighMVX back to LowMVX in block 216. More specifically, EEC 10 sets current to $ITM_{MAX\_INC}$ and then decreases current to ($ITM_{DEC\_MV}$-$\Delta ITM_{MID}$), where $\Delta ITM_{MID}$ represents current value change to determine a mid-metering valve velocity. The values determined by test 200 are utilized to calculate a torque motor hysteresis or health check parameter in block 114 of method 100.

Built-in test values computed by EEC 10 are derived from the following:

$$\text{Torque motor hysteresis}=(ITM_{INC\_MV1}-ITM_{DEC\_MV})$$

$$\text{Max Velocity Ratio}=(\Delta Time_{DEC\_MAX}/\Delta Time_{INC\_MAX})$$

$$\text{Decreasing Velocity Ratio}=(\Delta Time_{DEC\_MID}/\Delta Time_{DEC\_MAX})$$

At this point it should be understood that the exemplary embodiments provide a system to determine when a fuel screen test is required and a fuel screen test to determine whether a SSSV screen requires maintenance. By monitoring screen health, engine performance issues associated with a reduced velocity of a metering valve can be avoided.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of sensing a reduction in fuel screen area in a fuel system, the method comprising:
   detecting an engine shutdown;
   initiating an electronic engine control (EEC) built in test;
   shifting a metering valve from a first position to a second position;
   determining a travel time of the metering valve; and
   sensing a reduction in fuel screen area based on the travel time of the metering valve.

2. The method of claim 1, further comprising:
   shifting the metering valve from the second position to a third position;
   determining another travel time of the metering valve; and
   sensing a reduction in fuel screen area based on at least one of the travel time and another travel time.

3. The method of claim 2, wherein shifting the metering valve to the third position comprises shifting the metering valve back toward the first position.

4. The method of claim 1, wherein shifting the metering valve includes increasing current to a servovalve in steps until the metering valve begins to shift.

5. The method of claim 1, wherein determining the travel time comprises measuring a time required for the metering valve to travel between the first and second positions.

6. The method of claim 1, wherein shifting the metering valve from a first position to a second position includes passing fuel from a servovalve to the metering valve.

7. An electronic engine control (EEC) comprising: processing circuitry that, in response to a set of instructions, directs the EEC to:
   detect an engine shutdown;
   initiate an electronic engine control (EEC) built in test;
   shift a metering valve from a first position to a second position;
   determine a travel time of the metering valve; and
   sense a reduction in fuel screen area based on the travel time of the metering valve.

8. The EEC according to claim 7, wherein the set of instructions, when received by the processing circuitry, direct the EEC to:
   shift the metering valve from the second position to a third position;
   determine another travel time of the metering valve; and
   sense a reduction in fuel screen area based on at least one of the travel time and the another travel time.

9. The EEC according to claim 8, wherein the set of instructions, when received by the processing circuitry, direct the EEC to: shift the metering valve back toward the first position to shift the metering valve to the third position.

10. The EEC according to claim 7, wherein the set of instructions, when received by the processing circuitry, direct the EEC to: increase current to a servovalve in steps until the metering valve begins to shift.

11. The EEC according to claim 7, wherein the set of instructions, when received by the processing circuitry, direct the EEC to: measure a time required for the metering valve to travel between the first and second positions to determine travel time.

12. The EEC according to claim 7, wherein the set of instructions, when received by the processing circuitry, direct the EEC to: pass fuel from a servovalve to the metering valve to shift the metering valve from the first position to the second position.

13. A fuel control system comprising:
   a servovalve including a torque motor and a least one screen;
   a metering valve fluidly connected to the servovalve;
   an electronic engine control (EEC) operatively connected to the servovalve, the EEC being configured and disposed to determine a flow parameter of the at least one screen; and
   sensing a reduction in fuel screen area based on the travel time of the metering valve.

* * * * *